US00RE34679E

United States Patent [19]

Ritzenthaler et al.

[11] E Patent Number: Re. 34,679

[45] Reissued Date of Patent: Aug. 2, 1994

[54] LEVEL MEASURING DEVICE

[75] Inventors: Hugo A. Ritzenthaler, Rochester Hills; Scott Polando, Lake Orion, both of Mich.

[73] Assignee: VDO Adolf Schindling AG, Frankfurt am Main, Fed. Rep. of Germany

[21] Appl. No.: 911,144

[22] Filed: Jul. 9, 1992

Related U.S. Patent Documents

Reissue of:

[64] Patent No.: 4,939,932
Issued: Jul. 10, 1990
Appl. No.: 330,594
Filed: Mar. 28, 1989

[51] Int. Cl.[5] ..... G01F 23/32; G01F 23/36

[52] U.S. Cl. ..... 73/317; 73/313; 338/33; 340/625

[58] Field of Search ..... 73/313, 317, 318; 340/625, 623; 338/33

[56] References Cited

U.S. PATENT DOCUMENTS

| | | | |
|---|---|---|---|
| 1,902,933 | 3/1933 | Zubaty | 73/313 |
| 3,348,413 | 10/1967 | Zimmerle | 73/313 |
| 3,449,955 | 6/1969 | Stadelmann | 73/313 |
| 3,731,805 | 5/1973 | Schniers | 73/313 |
| 3,925,747 | 12/1975 | Woodward et al. | 73/313 |
| 3,968,896 | 7/1976 | Giacoletti et al. | 73/317 |
| 4,114,130 | 9/1978 | Sutton et al. | 73/317 |
| 4,557,144 | 12/1985 | Lucchini | 73/317 |
| 4,641,122 | 2/1987 | Hennequin | 73/317 |
| 4,706,707 | 11/1987 | Betterton et al. | 137/558 |
| 4,790,185 | 12/1988 | Fedelem et al. | 73/317 |
| 4,807,472 | 2/1989 | Brown et al. | 73/317 |
| 4,841,771 | 6/1989 | Glover et al. | 73/317 |

FOREIGN PATENT DOCUMENTS

| | | | |
|---|---|---|---|
| 1159806 | 7/1969 | United Kingdom | 73/313 |

*Primary Examiner*—William A. Cuchlinski, Jr.
*Assistant Examiner*—Diego F. F. Gutierrez
*Attorney, Agent, or Firm*—Martin A. Farber

[57] ABSTRACT

A level measuring device for measuring the level of a liquid in a container. The device has an elongated support which extends approximately horizontally into the container and is fastened at a fastening end 6 to a wall 3 of the container while its other resting end 3 rests under initial spring pressure against the bottom 2 of the container. On the support there is fastened a carrier 12 on which a mechanical-electrical transducer is disposed and on which there is pivotally mounted a lever 13 which bears a float 14 and acts on the transducer. The support is developed as an elastic spring in the region between its fastening end 6 and the carrier 12.

11 Claims, 1 Drawing Sheet

LEVEL MEASURING DEVICE

Matter enclosed in heavy brackets [ ] appears in the original patent but forms no part of this reissue specification; matter printed in italics indicates the additions made by reissue.

FIELD AND BACKGROUND OF THE INVENTION

The present invention relates to a level measuring device for measuring the level of the liquid in a container, the device having an elongated support which extends approximately horizontally into the container and is fastened at one fastening end to a wall of the container while with its other resting end rests under initial spring pressure against the bottom of the container. The device includes a carrier which is fastened to the support and on which there is affixed a mechanical-electrical transducer on which there is pivotally mounted a lever which bears a float and controls the transducer.

In such level-measuring devices it is known to develop the support in two parts and to connect these two parts together by a joint. A spring, has one end fastened to one part of the support connected to the housing and acts with its other end on a second part of the support in such a manner that a free end of the second part of the support is held with initial stress against the bottom of the container.

This application of the free end of the support against the bottom of the container is maintained even if the bottom of the container sags due to a filling of the container with liquid. In this way, the mechanical-electrical transducer, regardless of any sagging of the bottom of the container, remains substantially always in the same position relative to the bottom of the container. This construction of the measuring device prevents degradation of a measurement of the level measuring device due to varying amounts of sag in the bottom of the container.

An attempted construction of a level measuring device has suffered a disadvantage in that it consists of a plurality of parts, so that assembly is very expensive and the risk of defects is great.

It is therefore an object of the invention to provide a level measuring device of the aforementioned type which consists of only a few parts and permits a precise determination of the level within the container.

SUMMARY OF THE INVENTION

According to the invention, the support is developed as an elastic spring in a region between its fastening end (6) and a carrier (12) or between the carrier (12) and the resting end (5).

By this development, the support, the spring and the joint are formed by a single part of simple construction which permits easy assembling, is free of defects, and assures an exact measurement of the level. The level measuring device is preferably installed in the fuel tank of a motor vehicle.

The support can be of bar shape, and preferably tube-shape.

It is particularly simple to manufacture if the spring is formed by one or more spiral turns (11) of the support.

In such case, a particularly large spring path can be obtained if a plane of the turns (11) is approximately vertical.

In a two-fold function, the support may also comprise a suction tube (4) for removing liquid from the container.

In this case, the suction tube (4) can be provided with a suction foot (10) on the resting end of the support, and its fastening end (6) can be conducted outward tightly through the container wall (3) and form a suction connection (9).

The mechanical-electrical transducer is preferably a variable resistor.

BRIEF DESCRIPTION OF THE DRAWINGS

With the above and other objects and advantages in view, the present invention will become more clearly understood in connection with a detailed description of a preferred embodiment, when considered with the accompanying drawings, of which.

DETAILED DESCRIPTION OF THE PREFERRED EMBODIMENT

Figure 2:
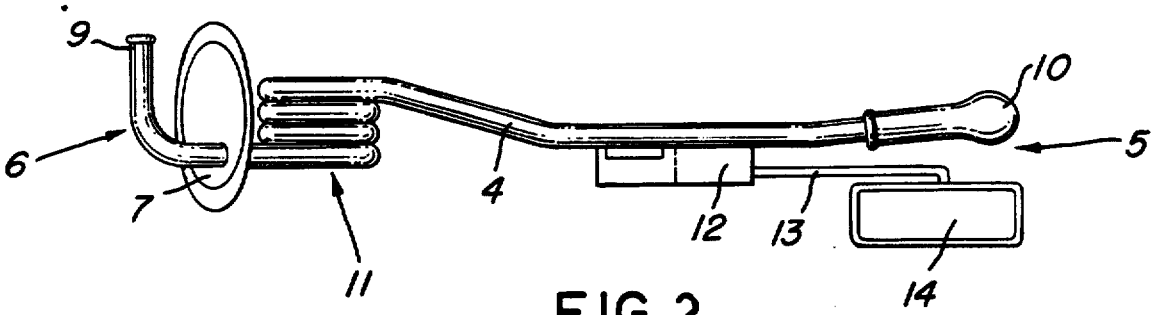
FIG. 2 is a top view of the level measuring device in FIG. 1.
Figure 1:
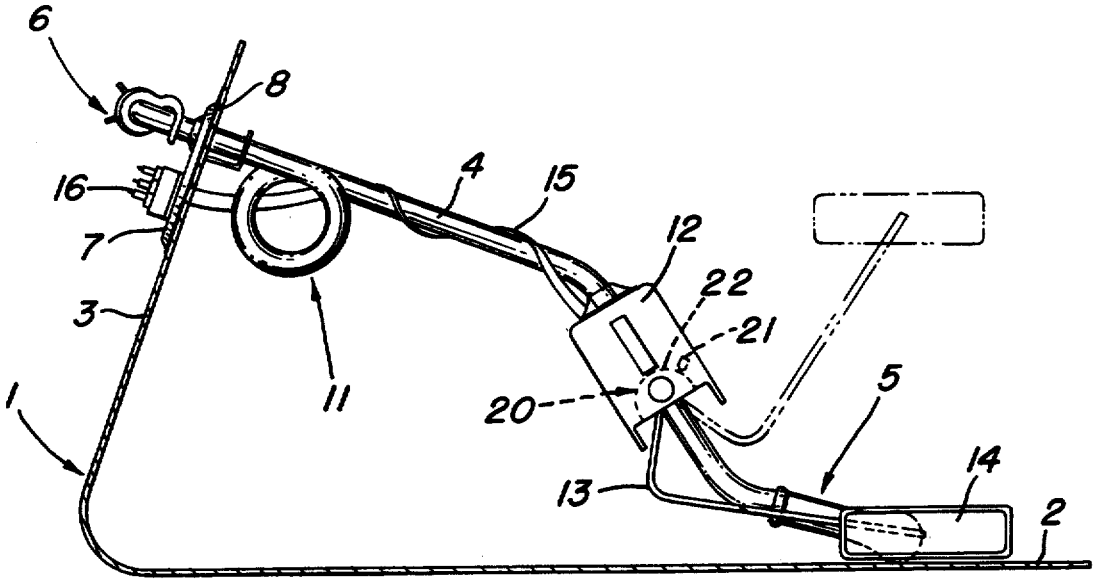
FIG. 1 is a side view of a level measuring device in a fragmentary view of the container.

The level measuring device shown in the figures is arranged in a fuel tank 1 of a motor vehicle, a part of the bottom 2 of the tank and a part of the side wall 3 being shown in section.

A support developed as suction tube 4 lies with its resting end 5 applied under initial stress against the bottom 2 and is fastened at its fastening end 6 to the wall 3.

For this purpose, a flange 7 is arranged in the region of the fastening end 6 on the suction tube 4, the flange being fastened, resting tightly against it, to the outside of the wall 3 and closing an opening 8 in the wall 3 through which the fastening end 6 extends outward and forms a suction connection 9.

A suction foot 10, which may contain a filter, is arranged on the resting end 5 of the suction tube 4.

In the region closer to the wall, the suction tube 4 is shaped to form several spiral turns 11 the plane of which is vertical and which forms an elastic spring by which the resting end 5 is urged with initial stress against the bottom 2. Between the resting end 5 and the turns 11, there is fastened on the suction tube 4 a housing-like carrier 12 on which there is pivotally mounted a lever 13 which bears a float 14 at one end. The other end of the lever 13 acts on a variable resistor 20 which is located in a housing-like carrier 12 to produce a signal which is dependent on the position of the lever 13. The variable resistor 20 is shown in phantom, and includes a slide contact 21, movable by the lever 13 about a fixed resistive element 22. The signal of the resistor 20 is conducted via electric lines 15 to an electric plug 16 arranged on the outside of the flange 7. The plug 16 may be connected to an indicating device, not shown.

By way of example, the container may be a tank holding fuel for the engine of a motor vehicle. The fuel may be withdrawn from the tank via the suction tube 4. Thereby, the suction tube 4 serves the dual function of fuel withdrawal element and support for the carrier 12, the lever 13 and the resistor 20.

We claim:

1. A level measuring device for measuring the level of the liquid in a container, the device comprising an elongated support which extends approximately horizontally into the container and includes a first end and a second end opposite the first end, the support being fastened at its first end to a wall of the container while the second end of the support rests under initial spring pressure against a bottom of the container;

a carrier fixed to the support between the first and the second ends of the support;

a mechanical-electrical transducer supported by the carrier and having a lever mounted pivotally to the transducer, there being a float carried by the lever for controlling the transducer; and wherein the support is formed as an elongated member, the elongated member being bent in the manner of a coil having at least one turn in a region between the carrier and said first end of the support, the coil functioning as an elastic spring; and a plane of said at least one turn is approximately vertical *with respect to a surface of the liquid* and parallel to a vertical plane containing said first and said second ends fo the support.

2. A level measuring device according to claim 1, wherein the support has a bar shape.

3. A level measuring device according to claim 1, wherein the support is of tubular shape.

4. A level measuring device accoring to claim 1, wherein the support is configured as a suction tube.

5. A level measuring device according to claim 4, wherein

*the second end of the support comprises a suction foot,* the suction tube [is provided] *connects* with [a] *the* suction foot [at the second end of the support], and the first end of the support is conducted outwardly tightly through a wall of the container to form a suction connection.

6. A level measuring device according to claim 1, wherein the mechanical-electrical transducer is a variable resistor.

7. A level measuring device according to claim 1, wherein the support is configured as a suction tube; and an inlet end of the suction tube is located at the bottom of the container at a site distant from said container wall.

*8. Apparatus operative with liquid in a container, comprising:*

*an elongated support which extends within the container and includes a first end and a second end opposite the first end, the support being fastened at its first end to the container, the second end of the support resting under spring pressure against a bottom of the container;*

*a carrier fixed to the support between the first and the second ends of the support;*

*a mechanical-electrical device operative with the liquid and supported by the carrier;*

*wherein the support is formed as an elongated member, the elongated member being bent in the manner of a coil having at least one turn in a region between the carrier and said first end of the support, the coil functioning as an elastic spring; and*

*a plane of said at least one turn is approximately vertical with respect to a surface of the liquid and parallel to a vertical plane containing said first and said second ends of the support.*

*9. Apparatus according to claim 8, wherein*

*the support is configured as a suction tube;*

*the second end of the support comprises a suction foot; and*

*the suction tube connects with the suction foot, and the first end of the support is conducted outwardly tightly through a wall of the container to form a suction connection.*

*10. Apparatus operative with liquid in a container, comprising:*

*an elongated support which extends within the container and includes a first end and a second end opposite the first end, the support being fastened at its first end to the container, the second end of the support resting under spring pressure against a bottom of the container;*

*a carrier fixed to the support between the first and the second ends of the support;*

*a mechanical-electrical device operative with the liquid and supported by the carrier;*

*wherein the support is formed as an elongated member, the elongated member being bent in the manner of a coil having at least one turn in a region between the carrier and said first end of the support, the coil functioning as an elastic spring; and*

*said at least one turn lies approximately in a plane which is vertical with respect to a surface of the liquid and contains said first and said second ends of the support.*

*11. Apparatus according to claim 10, wherein*

*the support is configured as a suction tube;*

*the second end of the support comprises a suction foot; and*

*the suction tube connects with the suction foot, and the first end of the support is conducted outwardly tightly through a wall of the container to form a suction connection.*

* * * * *